US009004145B2

(12) United States Patent
Toledo (10) Patent No.: US 9,004,145 B2
(45) Date of Patent: Apr. 14, 2015

(54) SECURABLE COVER APPARATUS FOR TRADE SHOW BOOTHS

(75) Inventor: Dario Toledo, New York, NY (US)

(73) Assignee: Boothseal LLC, New York, NY (US)

( * ) Notice: Subject to any disclaimer, the term of this patent is extended or adjusted under 35 U.S.C. 154(b) by 114 days.

(21) Appl. No.: 13/433,457

(22) Filed: Mar. 29, 2012

(65) Prior Publication Data

US 2013/0255895 A1  Oct. 3, 2013

(51) Int. Cl.
| | | |
|---|---|---|
| *A47G 5/00* | (2006.01) | |
| *E04B 2/76* | (2006.01) | |
| *A47H 13/00* | (2006.01) | |
| *A47H 99/00* | (2009.01) | |
| *E06B 3/80* | (2006.01) | |
| *E04H 1/12* | (2006.01) | |
| *E04H 15/00* | (2006.01) | |
| *F16B 12/02* | (2006.01) | |
| *F16B 12/42* | (2006.01) | |

(Continued)

(52) U.S. Cl.
CPC ... *A47G 5/00* (2013.01); *E04B 2/76* (2013.01); *A47H 13/00* (2013.01); *A47H 99/00* (2013.01); *E06B 3/80* (2013.01); *E04H 1/1272* (2013.01); *E04H 15/008* (2013.01); *E04B 2002/7479* (2013.01); *A47B 96/1466* (2013.01); *F16B 12/02* (2013.01); *F16B 12/42* (2013.01); *A47B 2230/0018* (2013.01)

(58) Field of Classification Search
CPC ..... E04B 2/76; E04B 2002/7479; A47G 5/00; A47H 13/00; A47H 99/00; E06B 3/80; E04H 1/1272; E04H 15/008; A47B 96/1466; A47B 2230/0018; F16B 12/02; F16B 12/42

USPC .............. 160/135, 351, 327, 368.1; 211/191, 211/192; 403/187–201; 248/211.11, 224.7
See application file for complete search history.

(56) References Cited

U.S. PATENT DOCUMENTS

| | | | |
|---|---|---|---|
| 870,563 | A | 11/1907 | Kindt |
| 1,697,027 | A | 1/1929 | Stevenson |

(Continued)

FOREIGN PATENT DOCUMENTS

| | | |
|---|---|---|
| CN | 2215547 | 12/1995 |
| DE | 3345255 A1 | 7/1984 |
| DE | 9407179 | 7/1994 |

OTHER PUBLICATIONS

European Patent Office (EPO), Supplementary European Search Report, Sep. 21, 2011.

(Continued)

*Primary Examiner* — Katherine Mitchell
*Assistant Examiner* — Johnnie A Shablack
(74) *Attorney, Agent, or Firm* — Stern & Schurin LLP (57) ABSTRACT

A securable cover apparatus for trade show booths comprising a flexible cover; a fastener mount attached to the flexible cover and a securable fastener having a rotating handle potion and a locking pin that is controlled by the handle portion. The fastener further includes a bracket wall with two guide members that are used to guide the fastener into a channel of the frame of the booth support structure. The securable cover apparatus is able to secure a trade show booth having a frame when the extending guide members of the securable fastener are slid between an opening in the frame and the locking pin is extended and rotated such that the frame of the tradeshow booth is positioned between flanges at the head of the locking pin and the bracket wall.

12 Claims, 5 Drawing Sheets

(51) Int. Cl.
*E04B 2/74* (2006.01)
*A47B 96/14* (2006.01)

(56) References Cited

U.S. PATENT DOCUMENTS

| | | | |
|---|---|---|---|
| 2,163,359 A | 6/1939 | Derveer | |
| 2,255,837 A | 9/1941 | Volk | |
| 3,071,350 A | 1/1963 | Opie | |
| 3,089,268 A | 5/1963 | Frey et al. | |
| 3,237,778 A | 3/1966 | Hoodis | |
| 3,464,480 A * | 9/1969 | Kuss | 160/368.1 |
| 3,750,739 A | 8/1973 | McGuire | |
| 3,763,917 A | 10/1973 | Antinone | |
| 3,844,548 A | 10/1974 | Rogers | |
| 3,911,537 A | 10/1975 | Mazur | |
| 3,955,722 A | 5/1976 | Bard | |
| 4,017,199 A * | 4/1977 | Strassle | 403/264 |
| 4,021,973 A | 5/1977 | Hegg et al. | |
| 4,100,957 A | 7/1978 | Shelton | |
| 4,102,353 A | 7/1978 | Pugliese | |
| 4,218,104 A | 8/1980 | Anderson et al. | |
| 4,388,786 A | 6/1983 | Gassler | |
| 4,455,103 A * | 6/1984 | Hackenberg | 403/190 |
| 4,493,172 A | 1/1985 | Jones | |
| 4,632,138 A | 12/1986 | Irwin | |
| 4,637,178 A * | 1/1987 | Nimmo et al. | 52/36.4 |
| 4,640,332 A | 2/1987 | Turner | |
| 4,700,916 A * | 10/1987 | Bastian et al. | 248/224.8 |
| 4,725,030 A * | 2/1988 | Miller et al. | 248/297.21 |
| 4,779,294 A | 10/1988 | Miller | |
| 4,800,947 A * | 1/1989 | Loomis | 160/368.1 |
| 4,805,735 A | 2/1989 | Anderson | |
| 4,941,763 A * | 7/1990 | Euteneuer | 403/3 |
| 4,986,389 A | 1/1991 | Halligan et al. | |
| 5,010,909 A | 4/1991 | Cleveland | |
| 5,044,294 A * | 9/1991 | Kronich et al. | 114/112 |
| 5,174,086 A | 12/1992 | Payne et al. | |
| 5,197,239 A | 3/1993 | Glynn et al. | |
| 5,246,052 A | 9/1993 | Homan | |
| 5,377,711 A | 1/1995 | Mueller | |
| 5,520,292 A | 5/1996 | Lombardi | |
| 5,522,165 A | 6/1996 | Molla | |
| 5,560,384 A | 10/1996 | Oh | |
| 5,657,809 A * | 8/1997 | Longoria et al. | 160/369 |
| 5,680,893 A | 10/1997 | Neer | |
| 5,768,722 A | 6/1998 | Olson et al. | |
| 5,813,641 A | 9/1998 | Baldwin | |
| 5,816,000 A | 10/1998 | Izatt et al. | |
| 5,819,474 A | 10/1998 | Strom | |
| 5,839,237 A | 11/1998 | Davidson | |
| 5,897,088 A | 4/1999 | Kirschner | |
| 5,906,004 A | 5/1999 | Lebby et al. | |
| 5,916,091 A | 6/1999 | Schultz | |
| 5,941,399 A | 8/1999 | Wang | |
| 5,966,877 A | 10/1999 | Hawes | |
| 6,067,911 A | 5/2000 | Marker et al. | |
| 6,105,912 A | 8/2000 | Lindsay et al. | |
| 6,119,317 A * | 9/2000 | Pfister | 24/514 |
| 6,145,528 A | 11/2000 | Egnew et al. | |
| 6,164,005 A | 12/2000 | Copeland | |
| 6,176,050 B1 | 1/2001 | Gower | |
| 6,267,525 B1 * | 7/2001 | Wu | 403/49 |
| 6,325,085 B1 | 12/2001 | Gower | |
| 6,353,946 B1 | 3/2002 | Steiner | |
| 6,386,657 B1 | 5/2002 | Frifeldt | |
| 6,415,515 B1 * | 7/2002 | Wheeler et al. | 30/208 |
| 6,554,235 B1 * | 4/2003 | Fortier | 248/122.1 |
| 7,337,582 B1 | 3/2008 | Klotz | |
| 7,422,048 B2 * | 9/2008 | Andersen | 160/377 |
| 7,461,485 B2 | 12/2008 | Toledo | |
| 7,526,896 B1 * | 5/2009 | Lohmeyer et al. | 52/202 |
| 7,610,727 B2 | 11/2009 | Toledo | |
| 7,654,045 B2 | 2/2010 | Wiegel | |
| 7,980,521 B2 * | 7/2011 | Harr et al. | 248/229.1 |
| 8,267,363 B2 * | 9/2012 | Begic et al. | 248/221.11 |
| 8,297,336 B2 * | 10/2012 | Yates | 160/377 |
| 8,474,770 B2 * | 7/2013 | Reo et al. | 248/224.7 |
| 8,567,138 B2 * | 10/2013 | Toledo | 52/222 |
| 8,607,844 B2 * | 12/2013 | Meza et al. | 160/368.1 |
| 8,702,339 B2 * | 4/2014 | Ballentine | 403/322.4 |
| 2002/0189660 A1 | 12/2002 | Livacich | |
| 2005/0183761 A1 | 8/2005 | Livacich | |
| 2008/0173779 A1 * | 7/2008 | Beno et al. | 248/309.1 |
| 2011/0010997 A1 * | 1/2011 | Kislov | 49/141 |
| 2011/0024059 A1 | 2/2011 | Livacich | |
| 2012/0012721 A1 * | 1/2012 | Baier | 248/224.7 |
| 2012/0272508 A1 * | 11/2012 | Stauss | 29/525.11 |
| 2013/0168625 A1 * | 7/2013 | Machacek et al. | 256/24 |
| 2013/0334383 A1 * | 12/2013 | Begic et al. | 248/221.11 |

OTHER PUBLICATIONS

European Patent Office (EPO), Office Action, Mar. 27, 2012, Application No. 03 759 462.9-2303, Applicant—Boothseal LLC.

* cited by examiner

SECURABLE COVER APPARATUS FOR TRADE SHOW BOOTHS

FIELD OF INVENTION

The present application relates generally to a system for providing secure enclosures for temporary structures. More specifically, the invention involves an apparatus for providing a securable enclosure for temporary booths typically used in trade shows.

BACKGROUND OF THE INVENTION

The industry of organizing and operating trade show events is complicated by common concerns that patrons have for protecting their wares from being stolen. Typically, a trade show booth has walls or partitions on all but one of its sides. The side that is left open is used to maximize the presentation area for potential viewers during the trade show. While this opening is particularly useful during trade show hours, it can present a problem during the off hours.

During the off hours of a show, it is convenient and efficient for booth operators to keep their products and wares in the booths to avoid losing the time required set up for each day of the show. However, this practice poses certain risks. For example, due to the open nature of the booth, there is little to no protection for the products or wares from being stolen.

One solution to this problem has been to restrict entry to the trade show venue. However, restricting entry will not prevent those who need to and/or have clearance to enter from stealing merchandise from a patron's booth. Moreover, hiring security guards to protect each booth is not economical.

Previous devices have attempted to resolve the aforementioned problems and provide a secure enclosure in the context of trade show booths. For example, partition systems taught by Hegg et al. (U.S. Pat. No. 4,021,973), Gassier (U.S. Pat. No. 4,388,786), Jones (U.S. Pat. No. 4,493,172), and Izatt et al. (U.S. Pat. No. 5,816,000) could not adequately serve this purpose. While they generally teach partition systems that may be used to construct discrete spaces for use as office dividers or convention exhibition booths, these systems are not designed to provide removable openings that satisfy the needs of trade show booth operators during off hours. In short, they lack a design for coverage of spacious openings while simultaneously promoting easy installation, removal and compact storage.

One effective device for securing trade show booths is taught by Toledo (U.S. Pat. No. 7,610,727), which resolves a number of the deficiencies of the prior art by providing a booth enclosure apparatus that is simple to install and remove. However, given the nature of trade show booths and the support structures used to build them, as well as the increased demand to provide a fastener that is easier to handle and use, there has been a need to create an updated apparatus for securing a trade show booth.

SUMMARY OF THE INVENTION

In view of the deficiencies and drawbacks in the prior art, it is a primary object of the present invention to provide an improved booth enclosure apparatus to provide a level of protection for exhibitors' merchandise from theft when the exhibitor is not present and the booth is not being used.

Another object of the present invention is to provide an improved booth enclosure apparatus that is simple to install and simple to remove.

A further object of the present invention is to provide an improved booth enclosure apparatus with a fastener that is compatible and adapted to be used with different forms of booth support structures commonly used at trade shows.

An additional object of the present invention is to provide an improved booth enclosure apparatus with a fastener that is easy to handle and secure a trade show booth.

Additional objectives will be apparent to those skilled in the art from the description of the invention that follows.

In summary, there is provided in a preferred embodiment of the present invention a booth enclosure apparatus. The apparatus includes a flexible cover; a fastener mount attached to the flexible cover using attaching means, and a securable fastener having a bracket, a handle potion, and a locking pin. The securable fastener has two side portions that allow it to slide against the mount base of the fastener mount such that the each of the side portions fit securely between a mount base and a parallel engaging member. The bracket further includes a bracket wall with at least two extending guide members protruding outward in a direction away from the handle portion that are used to guide the fastener into a channel of the frame of the booth support structure. The handle portion further includes at least two wings which define a space for grasping and rotating the handle portion of the fastener. The securable cover apparatus is able to secure a trade show booth having a frame when the extending guide members of the securable fastener are slid between an opening in the frame and the locking pin is extended and rotated such that the frame of the tradeshow booth is snuggly fit between flanges at the head of the locking pin and the bracket wall.

Additional features of the invention are described below in more detail.

BRIEF DESCRIPTIONS OF THE DRAWINGS

The above-described and other advantages and features of the present disclosure will be appreciated and understood by those skilled in the art from the following detailed description and drawings of which

DETAILED DESCRIPTION OF THE INVENTION

With reference to FIGS. 1 through 8, there is shown a first preferred embodiment of a securable cover apparatus 10 for providing a level of protection for trade show booths. The apparatus 10 comprises a flexible cover 20 to enclose the interior of the booth and restrict access thereto, a fastener mount 30 attached to the flexible cover 20 and a securable fastener 40 releasably mounted on the fastener mount and adapted to engage the support structure of the trade show booth, namely the frame F.

Normally, three of the four sides of a booth are fixed firmly by attaching temporary hard walls or partitions along support poles. One or more presentation sides may be left open to maximize the display area during the trade show hours. For protection after trade show hours, the securable cover apparatus 10 includes a lockable, removable cover 20 for deterring individuals from stealing merchandise from a display booth, which, when not in use, can be compactly stored.

Figure 1:
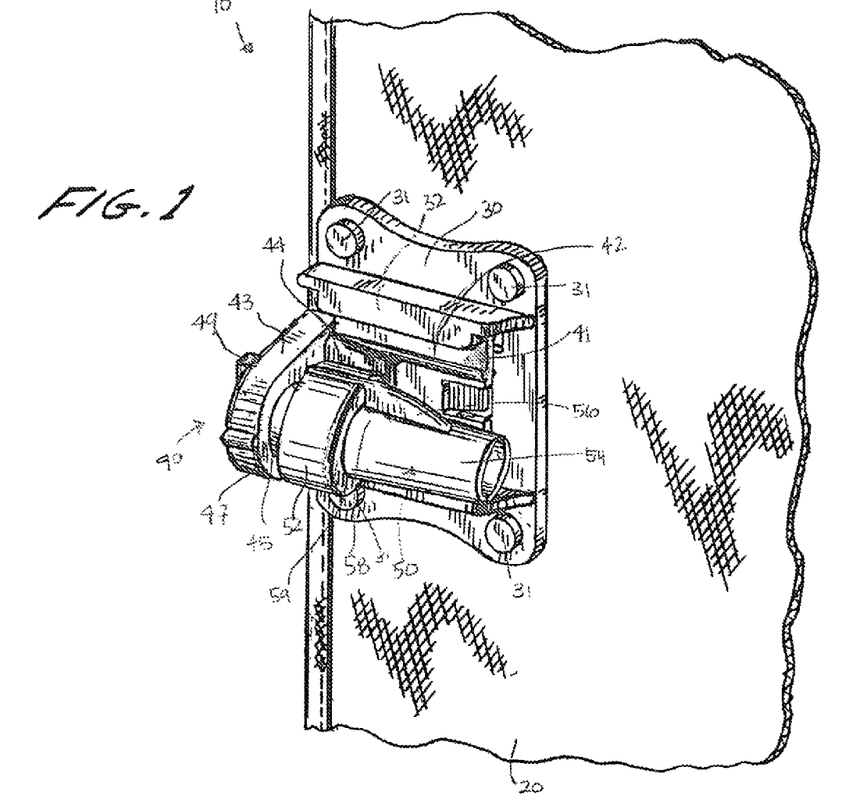
FIG. 1 is a perspective view of the securable cover apparatus, depicting a preferred embodiment of a securable fastener positioned in a corresponding fastener mount that is attached to a flexible cover.
Figure 2:
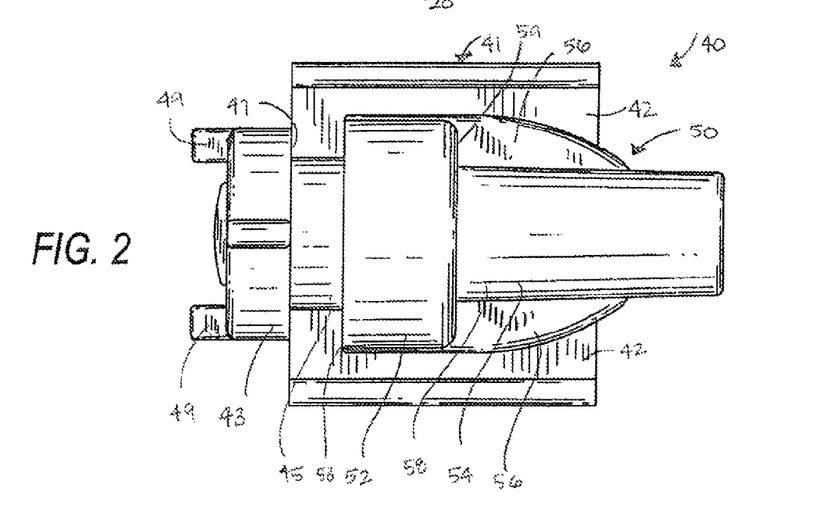
FIG. 2 is a top view of an unmounted securable fastener.
Figures 3, 4:
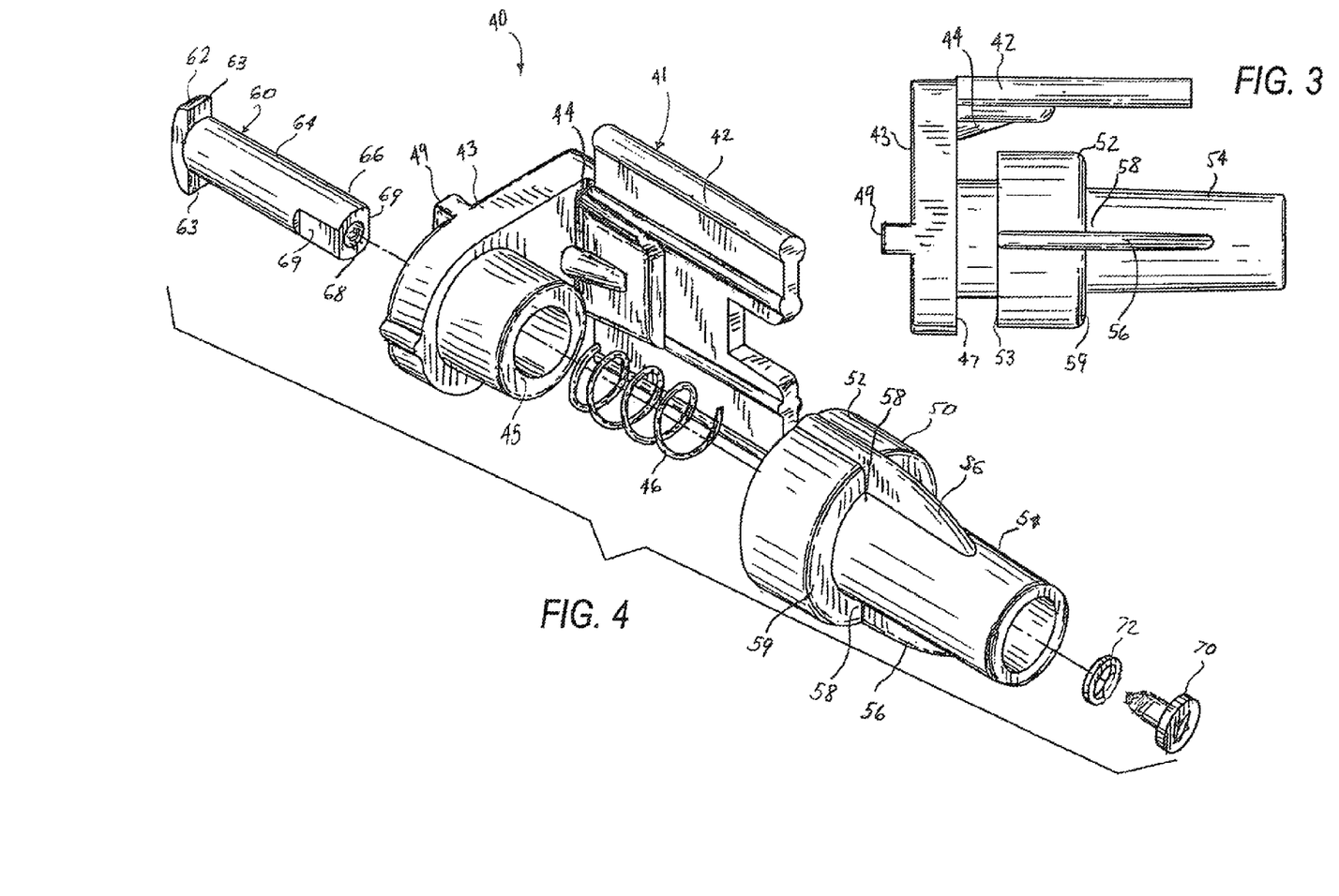
FIG. 3 is a side view of an unmounted securable fastener.
FIG. 4 is an exploded view of an unmounted securable fastener.
Figure 5:
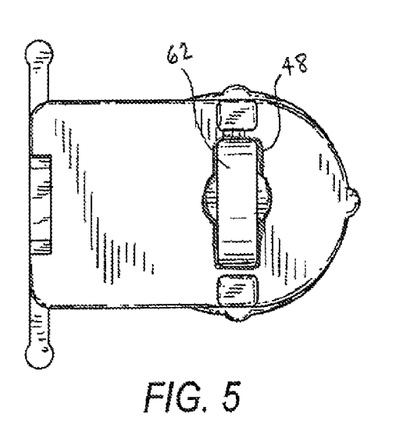
FIG. 5 is a front view of an unmounted securable fastener.

Referring to the drawings, FIG. 1 illustrates a securable fastener 40 attached to a flexible cover 20 using a fastener mount 30. The fastener mount 30 is preferably riveted to the flexible cover 20 with bolts 31, 31, 31, 31, however, other conventional means for securing the fastener mount 30 to the cover 20 may be used, such as clasps, snaps or strong adhesive material.

The flexible cover 20 is sized to enclose the presentation area of the trade show booth and flexible enough to be compactly stored when removed. Thus, the cover 20 should preferably be rectangular in shape to accommodate typical booths and sized so as to eliminate excessive slack when engaged (i.e., not overly large so as to diminish the level of protection provided). Preferably, for conventional booths, the flexible cover 20 is of a width in a range of about 110 to 120 inches and a height in a range of about 85 to 105 inches.

The flexible cover 20 includes a section of material or tarpaulin and may be formed of canvas, fabric, heavy plastic, synthetic polyester, Kevlar, or other appropriate material. The preferred material is durable, not easy to tear or otherwise breach so that a level of security can be obtained. The material may also be provided as a fire retardant fabric to satisfy any applicable fire codes pertinent to the location of use. With stronger materials, greater protection can be achieved to protect the contents of the booth, for example, by making the flexible cover from Kevlar, which would be resistant to cutting by sharp objects such as a knife. The material may be transparent but opaque material is favored so that the contents of the booth will not attract undesired attention. Preferably, the cover 20 does not have an incorporated frame so that it may fold compactly when removed from the frame of the booth.

To engage the flexible cover 20 to prevent access to the interior of the booth, the flexible cover 20 accommodates a means for securing the flexible cover 20 to the frame F. The means for securely fastening the flexible cover 20 to the F preferably promotes secure but easy removal such that it inhibits unauthorized users from removing the cover 20, but is also easy for booth occupants to apply and remove as desired. To this end, the means for securely fastening the flexible cover 20 is selectively removable from the cover 20 when they are not securing the cover 20 to the support frame F. In a preferred embodiment of the present invention, the means for securely fastening comprises a fastener mount 30 and a securable fastener 40 that connects to the fastener mount 20.

Figure 6:
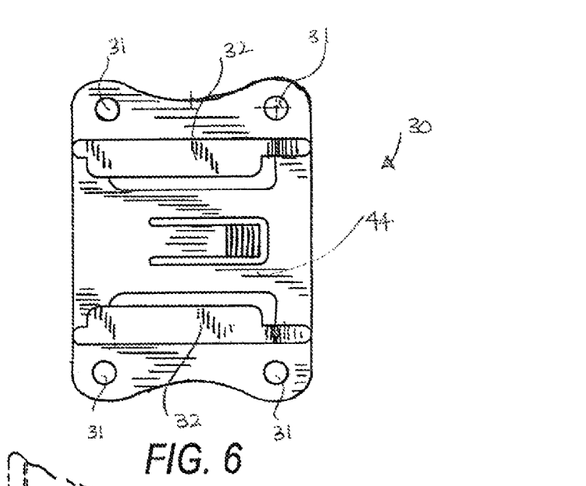
FIG. 6 is a top view of a mounting base structured to receive a preferred embodiment of a securable fastener.

As shown in FIG. 1 and FIG. 6, the fastener mount 30 includes two flanges or engaging members 32, 32 that form channels which each receive a side portion 42, 42 with enlarged, rounded edges of the securable fastener 40. Using FIG. 1 as a reference, in order to secure the side portions 42, 42 beneath the engaging members 32, 32 within the channel, the front of the bracket 41 is first positioned at the right end of the engaging members 32, 32. The fastener 40 then slides from right to left, allowing the side portions 42, 42 positioned at either end of the bracket 41 to slide beneath the engaging members 32, 32 for a predetermined distance, at which point the securable fastener 40 is held in place by a one-way stopper. In a preferred embodiment, the fastener 40 is selectively engaged and disengaged from the mount 30. Thus, after the fastener 40 is attached, it may be removed by actuating a release button or other conventional means known in the art. Once secure, the front end of the securable fastener 40 is able to attach to and engage a support structure or frame F.

As shown in more detail in FIGS. 2 through 4 and FIG. 7, the securable fastener 40 comprises, a bracket 41 having a substantially flat bottom surface and side portions 42, 42. Attached to the front end of the bracket 41 is a vertically extending bracket wall 43 with a bracing web or ramp 44 on the top surface of the bracket 41 buttressing the bracket wall 43. The upper portion of the bracket wall 43 comprises a pair of extending guide members 49 that help guide the fastener 40 to the spaces within the frame F when the fastener 40 is in use, but prior to securing the fastener 40 to the frame F. The upper portion of the bracket wall 43 also comprises a cylindrically shaped enclosure 45 which houses a spring 46. The spring 46 is maintained within the enclosure 45 by virtue of an impeding structure in the interior construction of the bracket wall 43 and/or enclosure 45 which prevents the spring 46 from exiting the enclosure 45 out the opposite end of the bracket wall 43.

The securable fastener 40 further comprises a handle portion 50 which is utilized to grip and manipulate the securable fastener 40 when the securable cover apparatus is in use. The handle 50 comprises a first, larger cylindrically shaped section 52 and a second, smaller cylindrically shaped section 54. The larger cylindrically shaped section 52 has a diameter and interior space that is large enough to accommodate the cylindrically shaped enclosure 45. In use, the handle 50 rotates about cylindrically shaped enclosure 45. The handle 50 further comprises a pair of wings 56, 56 that extend predominantly from the smaller cylindrically shaped section 54. The wings 56, 56 help a user grip and/or rotate the handle 50 as needed during the use of the securable fastener 40, generally allowing a user's thumb and index fingers to position themselves in the spaces 58 defined by a wing 56, the exterior surface of the smaller cylindrically shaped section 54 and the upper, exterior surface or ledge 59 formed by the larger cylindrically shaped section 52.

The securable fastener 40 further comprises a locking pin 60, the head 62 of which is positioned at the opposite side of the bracket wall 43. The locking pin 60 further comprises a shaft 64 and a tail 66 having an threaded aperture 68 to receive a securing screw 70 positioned and secured within the handle portion 50 when the securable fastener 40 is assembled. In addition to a securing screw 70, a washer 72 may be provided as well to help secure and maintain the screw 70. The tail 66 of the locking pin 60 further comprises flattened sections 69, 69 on either side of the tail 66 which are received within a correspondingly shaped aperture within the handle portion 50. This enables the handle 50 to turn the locking pin 60 and hence control rotation of the locking pin 60 when the securable fastener 40 is assembled and in use. The head 62 locking pin 60 further comprises two flanges or projections 63, 63 that fit securely and engage the support structure frame F, as shown in FIG. 8, when the fastener 40 is in use.

The handle portion 50 promotes easy manipulation of the securable fastener 40. The fastener 40 is configured so that it can be comfortably gripped between two fingers while applying a force to compress the spring 46 while simultaneously applying another force to rotate the handle 50 and the locking pin 60. Preferably, the fastener 40 is constructed to require both a compressing force to compress the spring 46 and extend the head 62 of the locking pin 60 from inside the space 48 in the bracket wall 43 within which it rests. While in that space 48, the head 62 of the locking pin 60 cannot rotate even if a rotating force is applied to the handle 50 by a user. The spring 46 is generally compressed and the handle 50 is correspondingly shifted a distance along the cylindrically shaped enclosure 45 corresponding to the space shown in FIG. 3 between the rear 47 of the bracket wall 47 and the bottom 53 of the larger cylindrically shaped section 52. After the head 62 is extended with a compressing force, the handle 50 can be turned clockwise or counterclockwise to rotate the locking pin 60 and the corresponding projections 63 at the head 62.

Figure 7:
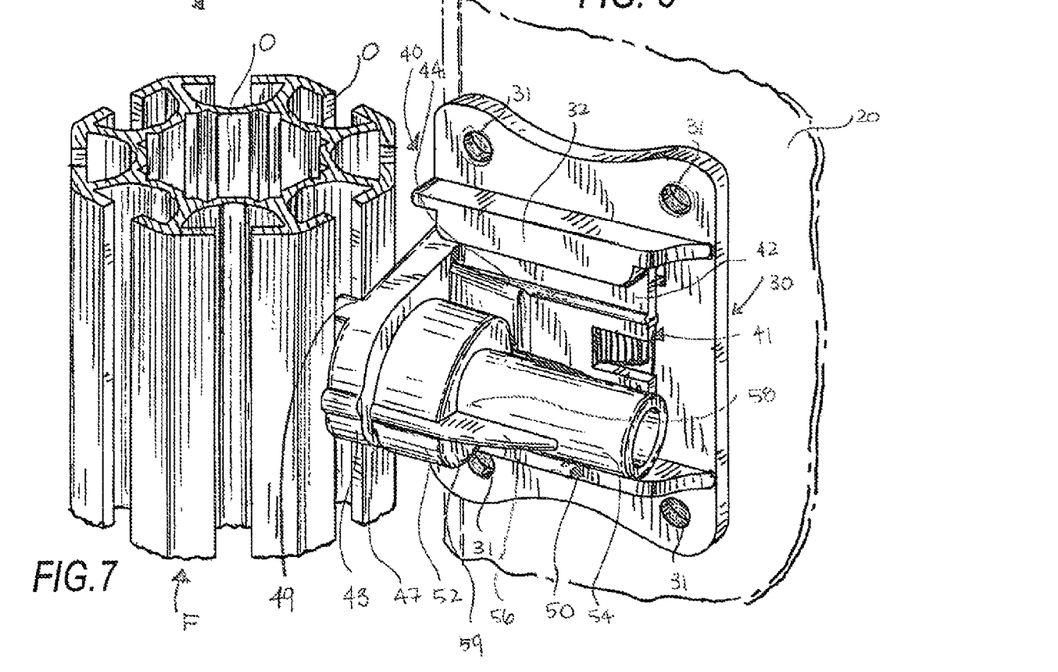
FIG. 7 is a perspective view of the securable fastener of the securable cover apparatus engaging one type of a booth support structure.
Figure 8:
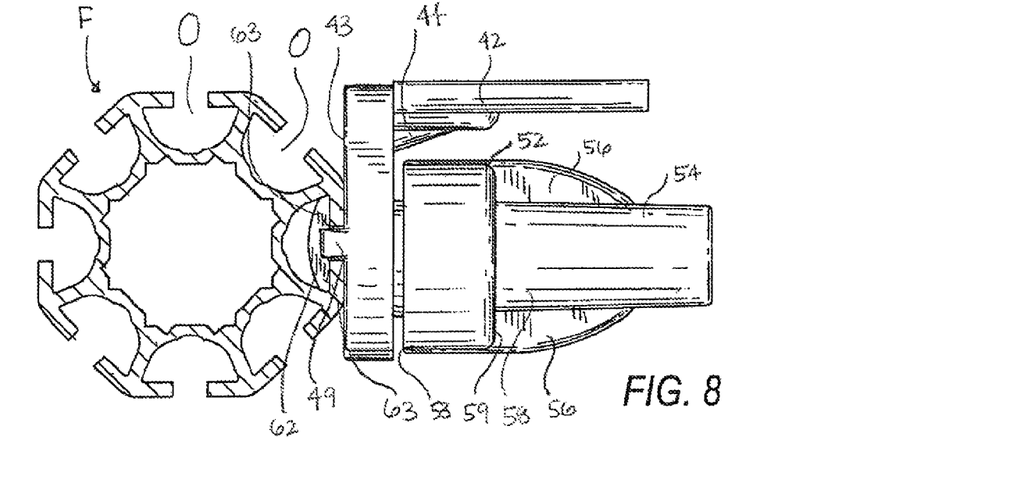
FIG. 8 is a side view of a securable fastener engaging the booth support structure shown in FIG. 7.
Figure 9:
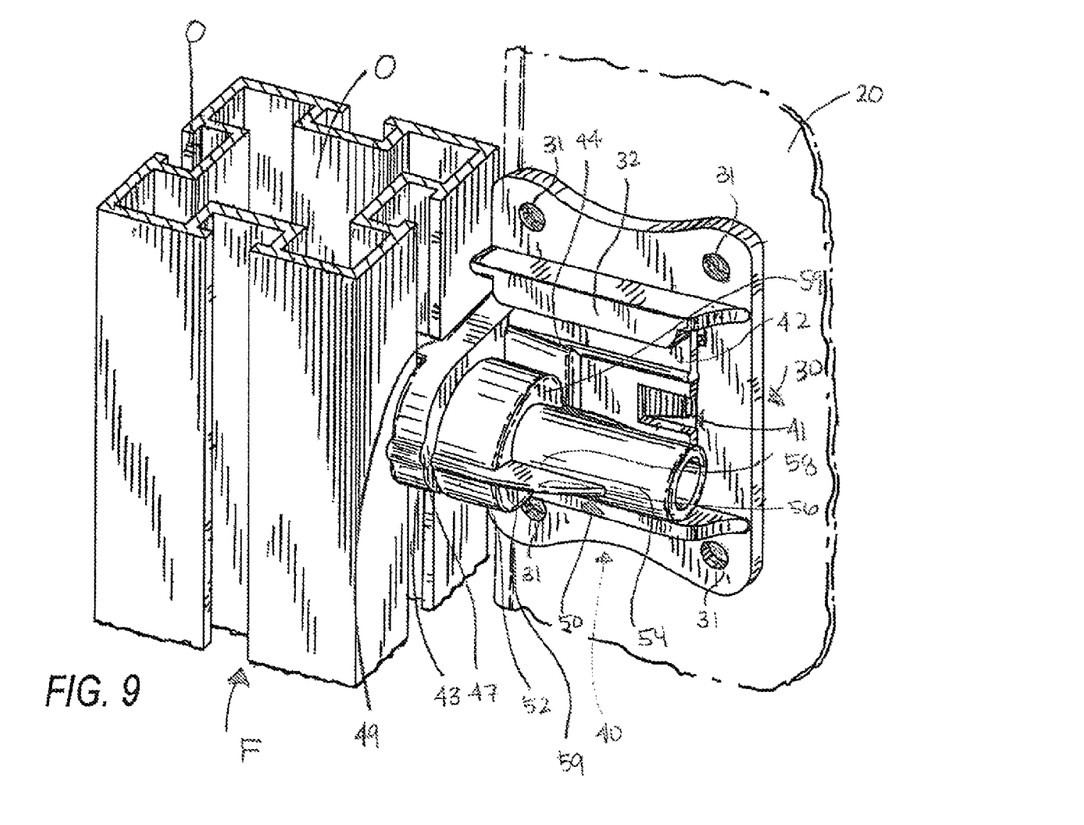
FIG. 9 is a second preferred embodiment of the securable cover apparatus engaging a second type of a booth support structure.

To secure the mounted securable fastener 40 to the frame F of the support structure, as shown in FIGS. 7-9, the extending guide members 49, 49 of the fastener are first inserted into one of the side openings O of the frame F such that the extending guide members 49, 49 are inline with one another and are both inserted substantially within the opening O of the frame F. A compressing force is then applied to the handle 50 extending the head 62 of the locking pin 60 beyond the extending guide members 49, 49. With the compressing force still being applied, the handle 50 is rotated thereby rotating the head 62 of the locking pin 60 and the corresponding projections 63 to the position shown in FIG. 8. The compressing force is then released allowing the handle 50 to move rearward, pulling the locking pin 60 with it. This causes the projections to hold the frame F to be held securely between the projections 63 and the bracket wall 43 of the fastener 40. When a user wishes to release the fastener 40, a compressing force is applied, the handle 50 is rotated to allow the projections 63, 63 to be in line with the extending guide members 49, 49 and the fastener 40 can then be disengaged from the frame F of the support structure.

Preferably, when the fastener 40 is engaged, to the frame F of the support structure, the handle portion 50 rotation should be limited by the user to approximately 90 degrees such that the projections 63 are positioned generally perpendicular to their original position while resting within the space 48 of the bracket wall 48. When the compressing force is released, the locking pin 60 is biased against the frame F thereby hindering rotation of the handle 50 until a compressing force is reapplied to rotate the handle 50. During release of the fastener 40, the rotation of the handle portion 50 by 90 degrees rotates the locking pin 60 such that the interior wall of the support structure frame F is no longer firmly fixed between the locking pin projections 63, 63 and the bracket wall 43. Thus, the extending guide members 49, 49 of the securable fastener 30 may then be removed from the side opening of the frame, releasing the cover 20 from the support structure.

Figure 10:
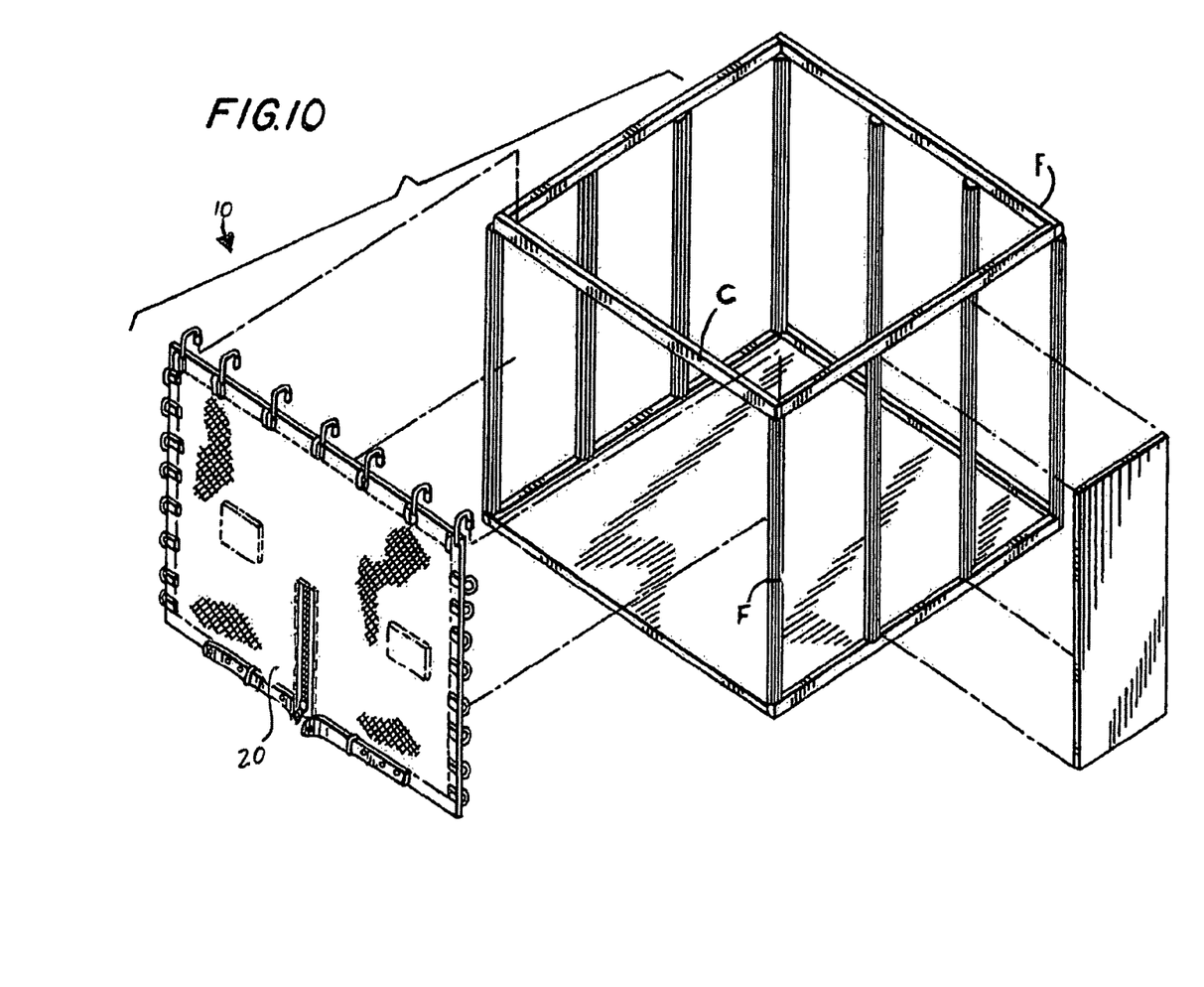
FIG. 10 is an embodiment of a securable cover apparatus, showing a hangers positioned along the top of the flexible cover for attaching it to a horizontal support structure.

FIG. 10 illustrates an embodiment of the securable cover apparatus 10, along the top horizontal edge of the flexible cover 20 that connects with a top horizontal cross bar C. Along the top edge, the flexible cover 20 is attached by hooks or hangers, which may be permanently or temporarily attached to the flexible cover 20. The hooks or hangers promote ease in attaching and removing the flexible cover 20 while at the same time allowing the cover to be moved by sliding along the cross bar C. In another embodiment, securable fasteners 40 mounted using a fasten mount 20 to the flexible cover 10 may be used to secure the top edge.

It is noted that in the designs described herein as illustrated in the drawings, use of the securable fastener 40 is not itself lockable but when mounted on the fastener mount 30 and combined with the flexible cover 20, the securable fasteners 40 are secure since the design of the fastener 40 is such that it is removable from only one side of the cover 20 as illustrated in FIGS. 7 and 9. When the securable fastener 40, which is mounted upon the fastener mount 30 is internal to the booth structure and attached to the flexible cover 20, the cover 20 in part prevents the fastener 40 from being removed or at least from being seen by one viewing with a casual eye. Likewise, the construction of the fastener 40 and fastener mount 30 preferably prevents the fastener 40 from being removed while it is engaged to a frame F since the fastener 40 cannot slide further along the fastener mount 30 in either direction. By using the securable cover apparatus 10, the cover 20 provides a level of protection from access to the booth. In order to provide access to the interior of the booth from the exterior (or conversely from the exterior of the booth to the interior) once the booth is locked, a lockable accessing opening may be provided in the cover 20, such as a locked zipper opening.

In another embodiment, the bottom edge of the flexible cover 20 may also be secured with the use of fasteners 40 mounted on fastener mounts 30 and attached to the cover 20. However, if the cover is properly sized and taut across the booth frame, such added measures may not be necessary.

In use, the embodiments of the invention discussed herein provide an apparatus that appropriately addresses the problem experienced by trade show exhibitors and boot operators. It can also provide some privacy when the exhibitor is setting up an exhibit before or between shows. In order to install, the flexible cover 20 is first unfolded. The cover 20 is then extended across a presentation side of the booth, with the top edge of the cover 20 attached to the top horizontal cross bar of the booth, either through the use of hangers, hooks, or a securable fastener 40 mounted on a fastener mount 30 attached to the cover 20. Once the top edge of the cover is secured, from inside the booth, the side edges of the cover 20 are attached to the side support structures of the booth as described above and illustrated in FIGS. 7 and 9. When all of the fasteners 40 mounted to the fastener mount 30 attached to the cover 20 are secured, the booth is exited through an access opening, which is then secured, such as with the use of a lock.

With regards to FIGS. 6 and 8-9, FIG. 9 illustrates a further embodiment of the securable cover apparatus 10. In this embodiment, the frame F of the tradeshow booth is constructed such that the openings O are essentially rectangular or square in nature. The securable cover apparatus 10 functions in the same fashion as described above with respect to the preceding illustrations. In this case, the securable fastener 40 and related components are somewhat larger to correspond to the larger frame, but it still incorporates a handle portion 50, a bracket wall 43 having at least two extending guide members 49, 49 and a locking pin 60 having flanges or projections 63, 63. Furthermore, the trade booth is secured the same manner as described above wherein the extending guide members 49, 49 are securing between the opening O of the frame F and the locking pin 60 is extended and rotated using the handle portion 50, securing the frame F between the flanges of the head of the locking pin 64 and the bracket wall 43.

The accompanying drawings only illustrate a securable cover apparatus, its constituent parts, and method of use. However, other types and styles are possible, and the drawings are not intended to be limiting in that regard. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A trade show booth security apparatus comprising:
   a flexible cover;
   a fastener mount attached to the flexible cover, said fastener mount having a mount base, a locking clip and two parallel engaging members;
   a securable fastener having a bracket, a handle portion, a locking pin and two side portions extending from said bracket, wherein when said securable fastener is engaged to said fastener mount, said bracket is retained by said locking clip and said side portions extending from said bracket are sized to fit securely between the mount base and said parallel engaging members;
   wherein the handle portion has a larger cylindrically shaped section, a smaller cylindrically shaped section, a spring enclosed within the interior of the handle portion, and at least two wings, wherein the larger cylindrically shaped section is connected to the smaller cylindrically shaped section and said at least two wings begin at the point where the larger cylindrically shaped section is connected to the smaller cylindrically shaped section.

2. The trade show booth security apparatus of claim 1 further comprising a bracket wall.

3. The trade show booth security apparatus of claim 2, wherein said bracket wall vertically extends from said bracket.

4. The trade show booth security apparatus of claim 2, wherein said locking pin is positioned to extend away from said bracket wall when said handle portion of said securable fastener is compressed toward said bracket wall.

5. The trade show booth security apparatus of claim 2, wherein said bracket wall comprises an extending guide member that fits into an opening in a frame of said trade show booth.

6. The trade show booth security apparatus of claim 5, wherein said locking pin is positioned interior of the bracket wall when said guide member is not inserted into said opening in said frame of said trade show booth.

7. A trade show booth security apparatus comprising:
   a flexible cover;
   a fastener mount attached to the flexible cover, said fastener mount having a mount base, a locking clip and two parallel engaging members;
   a securable fastener having a bracket, a handle portion, a locking pin and two side portions extending from said bracket, wherein when said securable fastener is engaged to said fastener mount, said bracket is retained by said locking clip and said side portions extending from said bracket are sized to fit securely between the mount base and said parallel engaging members;
   further wherein said bracket has a bracket wall vertically extending from the bracket, and said bracket wall contains at least one extending guide member that fits into an opening in a frame of said trade show booth;
   a space defined by at least two wings at said larger cylindrically shaped section and said smaller cylindrically shaped section to grasp and rotate said handle portion.

8. The trade show booth security apparatus of claim 7, wherein said locking pin is positioned interior of the bracket wall when guide member is not inserted into said channeled support frame.

9. The trade show booth security apparatus of claim 8, wherein said locking pin is positioned to extend away from said bracket wall when said handle portion of said securable fastener is compressed toward said bracket watt.

10. A trade show booth security apparatus comprising:
    a flexible cover;
    a fastener mount attached to the flexible cover, said fastener mount having a mount base, a locking clip and two parallel engaging members;
    a securable fastener having a bracket, a handle portion, a locking pin and two side portions extending from said bracket, wherein when said securable fastener is engaged to said fastener mount, said bracket is retained by said locking clip and said side portions extending from said bracket are sized to fit securely between the mount base and said parallel engaging members;
    further comprising a bracket wall extending from said bracket, and a guide member extending from said bracket wall, wherein when said guide member is inserted into a channeled support frame, said bracket wall and said locking pin are positioned relative to one another to retain a portion of said channeled support frame between said bracket wall and said locking pin.

11. The trade show booth security apparatus of claim 10, wherein said locking pin is positioned interior of the bracket wall when guide member is not inserted into said channeled support frame.

12. The trade show booth security apparatus of claim 11, wherein said locking pin is positioned to extend away from said bracket wall when said handle portion of said securable fastener is compressed toward said bracket wall.

* * * * *